United States Patent
Layton

(10) Patent No.: US 7,272,245 B1
(45) Date of Patent: Sep. 18, 2007

(54) METHOD OF BIOMETRIC AUTHENTICATION

(75) Inventor: William James Layton, Columbia, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 736 days.

(21) Appl. No.: 10/845,462

(22) Filed: May 13, 2004

(51) Int. Cl.
G06K 9/00 (2006.01)
G05B 19/00 (2006.01)
H04K 1/00 (2006.01)

(52) U.S. Cl. .................... 382/115; 340/5.2; 902/3; 713/186

(58) Field of Classification Search ........... 704/250, 704/256; 382/115–124; 283/68, 69, 78; 340/5.1, 5.2, 5.52, 5.53; 902/3; 356/71; 713/186
See application file for complete search history.

(56) References Cited

U.S. PATENT DOCUMENTS

| 6,035,398 A | 3/2000 | Bjorn | |
| 6,181,803 B1 | 1/2001 | Davis | |
| 6,317,834 B1 | 11/2001 | Gennaro et al. | |
| 7,020,283 B1 * | 3/2006 | Wada et al. | 380/46 |
| 7,200,549 B1 * | 4/2007 | Fujii et al. | 713/171 |
| 2004/0005059 A1 * | 1/2004 | Suzuki et al. | 380/277 |
| 2004/0158724 A1 * | 8/2004 | Carr et al. | 713/186 |

* cited by examiner

Primary Examiner—Bhavesh M Mehta
Assistant Examiner—Aaron W Carter
(74) Attorney, Agent, or Firm—Jennifer P. Ferragut

(57) ABSTRACT

The present invention is a method of biometric authentication. The first step is taking a series of measurements of the biometric. The second step is averaging those measurements to create a valid iris model. The third step is generating a random number. The fourth step is using an error-correcting code to create a codeword using the random number. The fifth step is generating a list of random locations corresponding to valid bits in the biometric reading. The sixth step is generating a list of numbers consisting of the combination of specified biometric bits and the codeword. The seventh step is generating the secret by performing a hash on the random number. The eighth step is storing the secret and the list to a certificate. The ninth step of the method is authenticating the subject.

27 Claims, 2 Drawing Sheets

US 7,272,245 B1

METHOD OF BIOMETRIC AUTHENTICATION

FIELD OF THE INVENTION

This invention relates to system access control based on user authentication by cryptography and, more specifically, to control using acquired biometric records.

BACKGROUND OF THE INVENTION

Biometrics is the science of identifying individuals based upon physiological or behavioral characteristics. In recent years, automated biometric systems have been developed that can be used to identify, or to verify, the identity of individuals. These systems are now being marketed not just to law enforcement, but to individuals and corporations that need to provide some measure of access control to computer systems or physical facilities. They are also being incorporated into encryption packages that are intended to protect personal files, private information and financial transactions.

Virtually all biometric products on the market today share a significant vulnerability. This vulnerability is serious enough to prevent the use of biometric technology in a number of otherwise useful circumstances. The vulnerability involves template reversal. A biometric system must store information, called a template, about authorized users in order to identify those users. One can use the template information stored on a system to create a false input to the biometric system that will grant access.

U.S. Pat. No. 6,035,398 entitled "CRYPTOGRAPHIC KEY GENERATION USING BIOMETRIC DATA," discloses a system for generating an encryption key using biometric data. The system first generates a template from the biometric, as discussed above. The system next hashes features, or a subset of features, of the biometric to create an encryption key. In an alternative embodiment, ghost points are combined with the template and the ghost points are extracted as the encryption key. The template and key together are used for verification. The present invention does not use this method for encryption or authentication. U.S. Pat. No. 6,035,398 is hereby incorporated by reference into the specification of the present invention.

U.S. Pat. No. 6,181,803 entitled "APPARATUS AND METHOD FOR SECURELY PROCESSING BIOMETRIC INFORMATION TO CONTROL ACCESS TO A NODE," discloses a system that compares captured biometric data with a stored biometric record, or template, to regulate access to a terminal or area. Several readings of the biometric are taken and a composite is created prior to comparing the readings to the template. This is to account for poor resolution of cameras acquiring the biometric readings. The present invention does not create a composite of the presented biometrics at the time of authentication, and therefore does not infringe this patent. U.S. Pat. No. 6,181,803 is hereby incorporated by reference into the specification of the present invention.

U.S. Pat. No. 6,317,834 entitled "BIOMETRIC AUTHENTICATION SYSTEM WITH ENCRYPTION MODELS," discloses a system that creates a biometric template for each user on the system. The template is then combined with a password created by the user to encrypt the model, the password being discarded by the system after encryption. To access the secured resource the user must present both his biometric and the appropriate password, which are combined to decrypt the model. The present invention does not create an encryption key from a password and biometric, and therefore does not infringe this patent. U.S. Pat. No. 6,317,834 is hereby incorporated by reference into the specification of the present invention.

The difficulty in producing a secure biometric system is that biometrics are not constant, even for an individual. From measurement to measurement there is always some difference. Thus, if one were to use a biometric as a password, when the user returned and attempted access, he would provide slightly different inputs to the system and would be rejected. It is therefore desirable in the art to have a system that allows use of a biometric for secured access while accounting for the inherent variations in the biometric. It is further desirable to have a biometric security system that overcomes the security vulnerabilities of prior art systems.

SUMMARY OF THE INVENTION

It is an object of the present invention to provide a biometric authentication method that does not allow data stored on the system to be directly reversed to recover the biometric.

It is another object of the present invention to provide a biometric authentication method that does not allow data stored on the system to be directly reversed to recover the biometric and that accounts for the inherent variation in individual biometric readings.

The present invention is a method of biometric authentication. The first step of the method is taking a series of measurements of the biometric, preferably an iris scan.

The second step of the method is averaging those measurements to create a valid iris model.

The third step of the method is to generate a random number, R.

The fourth step of the method is to use an error-correcting code to create a codeword, E, corresponding to the random number, R.

The fifth step of the method is to generate a list of random locations corresponding to valid bits in the biometric reading. Valid bits are bits that do not change between successive biometric readings.

The sixth step of the method is generating a list of numbers that include the list of random locations and the combination of the corresponding averaged biometric and the codeword, E.

The seventh step of the method is generating the secret value, preferably by performing a hash operation on the random number, R.

The eighth step of the method is storing the results of steps six and seven on a certificate for authentication purposes.

The ninth step of the method is authenticating the user.

To authenticate a user, the first step is to taking a biometric measurement from the subject. In an alternative embodiment a series of biometric measurements are again taken and averaged.

The second step of authentication is to take the stored numbers and combine the specified bits in the new biometric with the numbers stored in the list of numbers.

The third step of authentication is to recover the original random number, R.

The fourth step of authentication is to recover the secret value, preferably by performing a hash operation.

The fifth step of authentication is comparing the recovered secret value to the secret value stored on the certificate to authenticate the subject.

DETAILED DESCRIPTION OF THE PREFERRED EMBODIMENT

Figure 1:
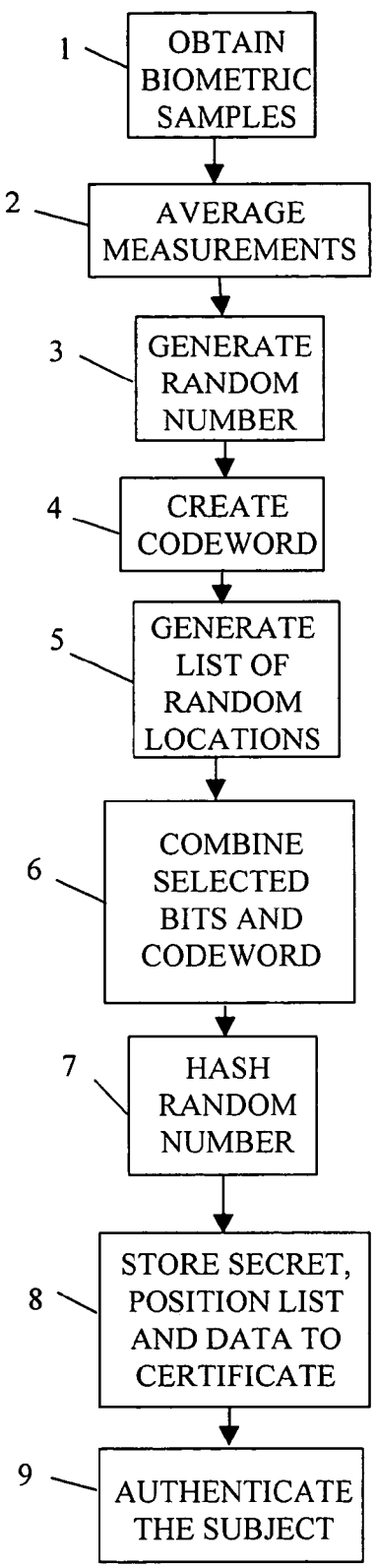
FIG. 1 is a flowchart of the encryption steps of the present invention.
Figure 2:
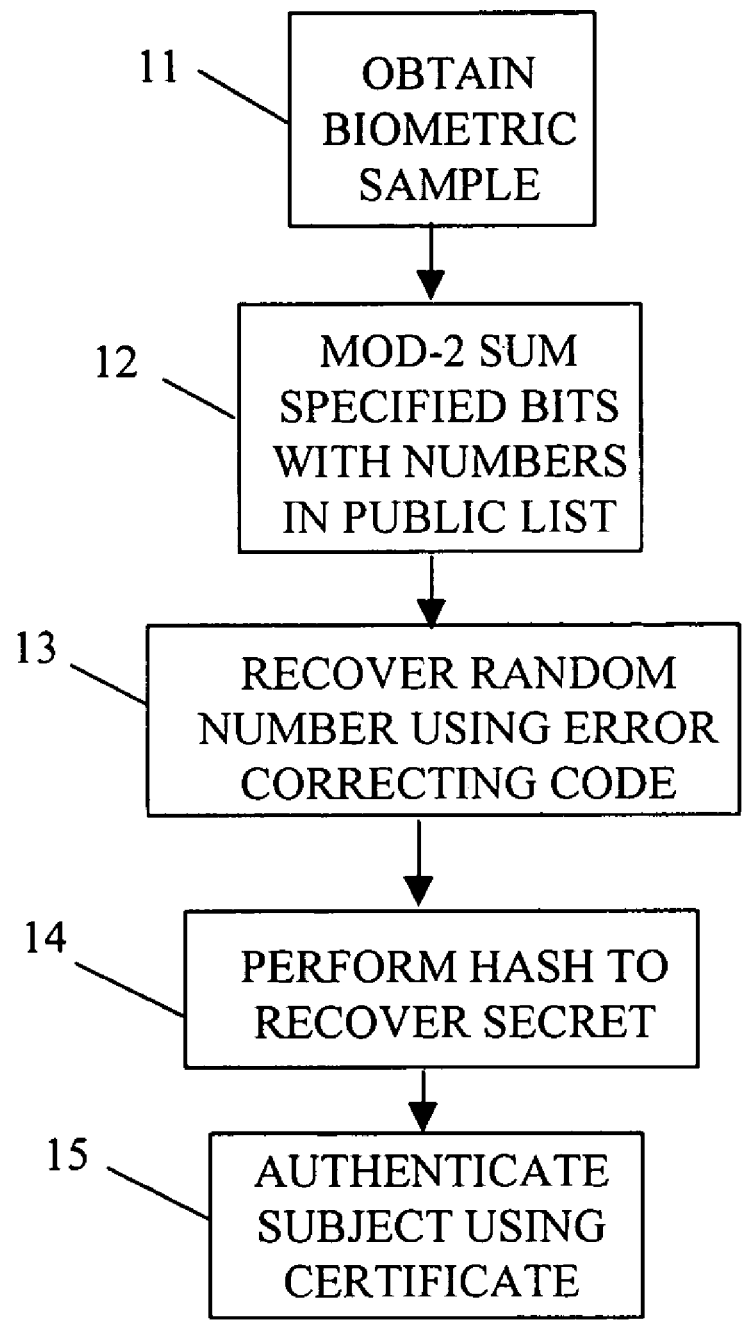
FIG. 2 is a flow chart of the decryption steps of the present invention.

The present invention is a method of biometric authentication. FIG. 1 is a list of the steps of the present invention, including both enrollment and authentication, and FIG. 2 is a detailed list of the authentication steps of the present invention.

The first step 1 of the method, shown in FIG. 1, is taking a series of measurements of a biometric. Although any biometric can be used in conjunction with the present invention, such as a fingerprint, face scan, or retinal scan, in the preferred embodiment the biometric used is an iris scan. Accordingly, the remainder of this disclosure will be directed to a method of encryption using an iris scan as the biometric. Many methods of taking an iris scan are well known and commonly used in the art, and any such method could be used. The result of such a scan, as with any biometric scan, is a collection of bits that represent the biometric of the subject.

To generate a reliable iris model for authentication purposes, in the second step 2 multiple readings of the iris are combined to create one improved iris model. In general, bits taken from two readings of an individual differ about 33% of the time. In the second step, the multiple iris scans are essentially searched for bits that are highly consistent among the separate scans. The approach is simply to count up the number of 1's and 0's in each location over a collection of different scans, and use a user-definable threshold, for example a majority vote, to determine the valid bits in the combined iris model. The valid bits are those that are most uniform in the set. A minimum number of valid bits may be specified, and the validity bits will be set for at least that number of high-consistency positions.

The third step 3 of the method is to generate a random number, R. This random number will be used to encode the iris model as will be explained in greater detail below.

The fourth step 4 of the method is to generate a codeword, E, corresponding to the random number, R. The codeword is preferably generated using an error-correcting code, though many other techniques could be used as would be obvious to one of skill in the art. Commonly when one encounters noise, one uses an error-correcting code to transmit information. Any such standard error-correcting code can preferably be applied to the random number, R, to obtain the codeword, E, many of which are well known and commonly used in the art. The error-correcting code is preferably what is known in the art as a "perfect code," one example of which is a Hamming code.

The fifth step 5 of the method is to generate a list of random locations corresponding to valid bits in the improved iris model. The number of random locations is preferably less than the total number of valid bits in the iris model. As stated before, valid bits are bits that do not change between successive biometric readings, these bits having been determined in the second step 2 of the method.

The sixth step 6 of the method is generating a list of numbers that includes the list of random locations and the non-linear, reversible combination of the corresponding merged iris model bits and the codeword, E. The combination of the bits and the codeword is preferably by way of a mod-2 sum, though any other suitable method may be used. At this point the error correcting code inherent in E has been used to obtain a secret value for a non-constant biometric. This means that the system can tolerate the natural variations inherent in iris models, and all other biometrics, but in a carefully controlled manner.

The seventh step 7 of the method is generating a secret value, S, by performing a predetermined hash operation on the random number, R. This hash function should reduce the bit length of R to a size comparable to the expected entropy of the iris model. This is used as a means of reducing the secret length to something comparable to the entropy in the biometric without loss of security. It also provides cryptologic strength that protects the biometric data against "near miss" biometric readings. This prevents attackers from gaining access by using fraudulent biometrics.

The eighth step 8 of the method is storing the secret value, S, the list of random locations, and the result of the non-linear combination of the biometric and codeword to a certificate. This certificate is used in conjunction with the biometric itself for authentication of the subject. Because the only values on the certificate area subset of encoded bits from the biometric, the secret value, S, and a list of positions on the biometric, it is impossible to recover the biometric information from the certificate information alone.

The ninth step 9 of the method is authenticating the subject. Many methods are well known and widely used in the art for authentication, and any such suitable method could be used in conjunction with this invention. A preferred method of authentication is discussed in detail below.

FIG. 2 is a list of steps that perform the ninth step 9 of the method of the present invention (i.e. the authentication step) shown in FIG. 1. The steps shown in FIG. 2 essentially reverse the steps of the process shown in FIG. 1.

The first step 11 of authentication, shown in FIG. 2, is to take a biometric measurement from the subject. In an alternative embodiment a series of biometric measurements are taken and averaged. Because of inconsistencies between biometric readings, more than one scan may need to be taken before authorization is obtained, as is obvious from the previous discussion. However, the number of rescans should be minimal with the present invention as compared with prior art systems.

The second step 12 of authentication is to perform a non-linear reversible combination on the specified bits in the new iris model and the numbers stored in the public list. The specified bits should be the random bits that were specified by the position list of the fifth step 5 of the method of FIG. 1. If a merged iris model is used, the merged valid bits are used for the specified bits.

The third step 13 of authentication is to recover the random number, R. This may be accomplished by using the error correcting code to recover the original random number, R. To do this the same error-correcting code previously applied to the random number, R, to produce the codeword, E, is applied in reverse to the result to recover the random number, R. The method of performing this operation is commonly known and widely used in the art. At this point the system may make an initial authentication that the random number, R, is in fact the correct number.

The fourth step 14 of authentication is to reproduce the secret value, S. This is preferably accomplished by performing the hash operation on the random number, R, to reproduce the secret value, S. In addition to reproducing the secret value, S, the hash operation also reduces the size of the random number, R, to the number of bits required for the secret value, S.

The fifth step 15 of authentication is comparing the recovered secret value, S, to the secret value, S, stored on the certificate to verify the user. If the values match, the user is authenticated. If the values do not match, the user is not authenticated.

What is claimed is:

1. A method of biometric authentication comprising the steps of:
   a) taking a plurality of measurements of a biometric from a subject;
   b) averaging said measurements to create a combined biometric consisting of a plurality of bits;
   c) generating at least one random number;
   d) generating a codeword from said at least one random number;
   e) generating a list of random locations corresponding to a user-definable set of valid bits in said combined biometric;
   f) combining the combined biometric readings that correspond to said random locations and said codeword;
   g) generating a list that comprises said list of random locations and the combination of said combined biometric readings and said codeword;
   h) generating a secret value;
   i) generating a certificate that includes said list and said secret value; and
   j) authenticating said subject using said certificate.

2. The method of claim 1, wherein said step of authenticating said subject further includes the steps of:
   a) taking at least one second biometric measurement from the subject;
   b) combining the bits in said at least one second biometric measurement corresponding to the locations from said list of random locations with said numbers stored in the list from said certificate;
   c) recovering said at least one random number;
   d) generating a second secret value; and
   e) comparing said second secret value to said secret value on said certificate to authenticate said subject.

3. The method of claim 1, wherein said step of generating a codeword from said at least one random number comprises generating a codeword from said random number by applying an error-correcting code to said at least one random number.

4. The method of claim 2, wherein said step of generating a codeword from said at least one random number comprises generating a codeword from said random number by applying an error-correcting code to said random number.

5. The method of claim 3, wherein said step of generating a secret value comprises generating a secret value by applying a hash function to said at least one random number.

6. The method of claim 4, wherein said step of generating a secret value comprises generating a secret value by applying a hash function to said at least one random number.

7. The method of claim 6, wherein said step of recovering said at least one random number comprises recovering said at least one random number using said error correcting code.

8. The method of claim 7, wherein said step of generating a second secret value comprises generating a second secret value by applying a hash function to said recovered at least one random number.

9. The method of claim 5, wherein said step of taking a plurality of measurements consists of taking a plurality of iris scan measurements.

10. The method if claim 8, wherein said step of taking a plurality of measurements consists of taking a plurality of iris scan measurements.

11. The method of claim 9, wherein said step of applying an error-correcting code consists of applying a Hamming code.

12. The method of claim 10, wherein said step of applying an error-correcting code consists of applying a Hamming code.

13. The method of claim 11, wherein said step of combining said biometric readings and said codeword comprises combining the combined biometric readings that correspond to said random locations and said codeword using a non-linear reversible combination chosen from the group of non-linear reversible combinations comprising mod-2 sum, and any other suitable non-linear reversible function.

14. The method of claim 12, wherein said step said step of combining said biometric readings and said codeword comprises combining the combined biometric readings that correspond to said random locations and said codeword using a non-linear reversible combination chosen from the group of non-linear reversible combinations comprising mod-2 sum, and any other suitable non-linear reversible function.

15. The method of claim 13, wherein said step of generating a list of random locations consists of generating a list of random locations wherein the number of random locations is less than the total number of locations of bits in the biometric.

16. The method of claim 14, wherein said step of generating a list of random locations consists of generating a list of random locations wherein the number of random locations is less than the total number of locations of bits in the biometric.

17. The method of claim 1, wherein said step of generating a secret value comprises generating a secret value by applying a hash function to said at least one random number.

18. The method of claim 2, wherein said step of generating a secret value comprises generating a secret value by applying a hash function to said at least one random number.

19. The method of claim 2, wherein said step of recovering said at least one random number comprises recovering said at least one random number using said error correcting code.

20. The method of claim 2, wherein said step of generating a second secret value comprises generating a second secret value by applying a hash function to said recovered at least one random number.

21. The method of claim 1, wherein said step of applying an error-correcting code consists of applying a Hamming code.

22. The method of claim 2, wherein said step of applying an error-correcting code consists of applying a Hamming code.

23. The method of claim 1, wherein said step of combining said biometric readings and said codeword comprises combining the combined biometric readings that correspond to said random locations and said codeword using a non-linear reversible combination chosen from the group of non-linear reversible combinations comprising mod-2 sum, and any other suitable non-linear reversible function.

24. The method of claim 2, wherein said step of combining said biometric readings and said codeword comprises combining the combined biometric readings that correspond to said random locations and said codeword using a non-linear reversible combination chosen from the group of non-linear reversible combinations comprising mod-2 sum, and any other suitable non-linear reversible function.

25. The method of claim 1, wherein said step of generating a list of random locations consists of generating a list of random locations wherein the number of random locations is less than the total number of locations of bits in the biometric.

26. The method of claim 2, wherein said step of generating a list of random locations consists of generating a list of random locations wherein the number of random locations is less than the total number of locations of bits in the biometric.

27. The method of claim 2, wherein step of taking said list from said certificate comprises taking said list from said certificate and performing a non-linear reversible combination of the bits in said at least one second biometric measurement corresponding to the locations from said list of random locations and said numbers stored in the list, said non-linear reversible combination being chosen from the group of non-linear reversible combinations comprising mod-2 sum, function and any other suitable non-linear reversible combination.

\* \* \* \* \*